United States Patent
Wang et al.

(10) Patent No.: US 8,203,618 B2
(45) Date of Patent: Jun. 19, 2012

(54) IMAGE PROCESSING DEVICE AND METHOD

(75) Inventors: Yung-Te Wang, Taipei (TW); Yung-Wei Chen, Taipei (TW)

(73) Assignee: Silicon Motion, Inc., Jhubei, Hsinchu County (TW)

( * ) Notice: Subject to any disclaimer, the term of this patent is extended or adjusted under 35 U.S.C. 154(b) by 607 days.

(21) Appl. No.: 12/340,848

(22) Filed: Dec. 22, 2008

(65) Prior Publication Data

US 2010/0066848 A1 Mar. 18, 2010

(30) Foreign Application Priority Data

Sep. 17, 2008 (TW) ................... 97135603 A

(51) Int. Cl.
*H04N 5/228* (2006.01)
*G06K 9/46* (2006.01)
*G06K 9/66* (2006.01)
(52) U.S. Cl. ..................... 348/222.1; 382/195
(58) Field of Classification Search ............... 348/222.1
See application file for complete search history.

(56) References Cited

U.S. PATENT DOCUMENTS 5,283,646 A * 2/1994 Bruder .................. 375/240.12
5,969,750 A * 10/1999 Hsieh et al. ................. 348/14.1
2004/0218672 A1 11/2004 Bourne et al.
2008/0118158 A1* 5/2008 Mizoguchi et al. ........... 382/195

OTHER PUBLICATIONS

Wallace, G.K.; , "The JPEG still picture compression standard," Consumer Electronics, IEEE Transactions on , vol. 38, No. 1, pp. xviii-xxxiv, Feb. 1992: 10.1109/30.125072 URL: http://ieeexplore.ieee.org/stamp/stamp.jsp?tp=&arnumber=125072&isnumber=3528.*
Taiwanese language office action dated Dec. 31, 2011.
Wallace, G.; "The JPEG Still Picture Compression Standard;" IEEE Trans. Consumer Electronics; vol. 38; No. 1; Feb. 1992; pp. 1-17.

* cited by examiner

*Primary Examiner* — Sinh Tran
*Assistant Examiner* — Christopher K Peterson
(74) *Attorney, Agent, or Firm* — Thomas|Kayden

(57) ABSTRACT

An image processing device including a camera, a discrete signal processor (DSP) and an output device is disclosed. The camera provides image data for the DSP to process. The DSP samples sub-image data to generate a first image processing signal, discrete cosine transforms the first image processing signal to generate a second image processing signal, uses a quantization table to quantize the second image processing signal to generate a third image processing signal, zig-zag scans the third image processing signal to generate a fourth image processing signal, and Huffman codes the fourth image processing signal to generate an output image signal. The DSP adjusts a cut point of a next fourth image processing signal according to the size of the fourth image processing signal so as to control the size of a next output image signal. The output device outputs the output image signal.

15 Claims, 4 Drawing Sheets

IMAGE PROCESSING DEVICE AND METHOD

CROSS REFERENCE TO RELATED APPLICATIONS

This application claims priority of Taiwan Patent Application No. 097135603, filed on Sep. 17, 2008, the entire contents of which are incorporated by reference herein.

BACKGROUND OF THE INVENTION

1. Field of the Invention

The invention relates to a method for compressing image data and more particularly relates to a method for compressing image data by dynamically adjusting the size of image data.

2. Description of the Related Art

FIG. 1 is a flowchart illustrating a compression process for Joint Photographic Experts Group (JPEG) images according to the prior art. Image data D10 is processed to generate image data P1 via YUV sampling (step B11), discrete cosine transform (DCT) (step B12), quantization (step B13), zig-zag scanning (step B14), and Huffman coding (step B15).

BRIEF SUMMARY OF THE INVENTION

An image processing method is provided for processing at least one image data, comprising: sampling a sub-image data to generate a first image processing signal; discrete cosine transforming the first image processing signal to generate a second image processing signal; quantizing the second image processing signal according to a quantization table so as to generate a third image processing signal; zig-zag scanning the third image processing signal to generate a fourth image processing signal; Huffman coding the fourth image processing signal to generate an output image signal; and adjusting a cut point of the next fourth image processing signal according to the size of the fourth image processing signal so as to control the size of the output image signal.

According to another embodiment of the invention, an image processing device is provided. The image processing device comprises a camera, a digital signal processor (DSP) and an output device. The camera provides image data to the digital signal processor for processing. The digital signal processor samples sub-image data to generate a first image processing signal, discrete cosine transforms the first image processing signal to generate a second image processing signal, uses a quantization table to quantize the second image processing signal to generate a third image processing signal, zig-zag scans the third image processing signal to generate a fourth image processing signal, Huffman codes the fourth image processing signal to generate an output image signal, and adjusts a cut point of the next fourth image processing signal according to the size of the fourth image processing signal so as to control the size of the output image signal. The output device outputs the output image signal.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
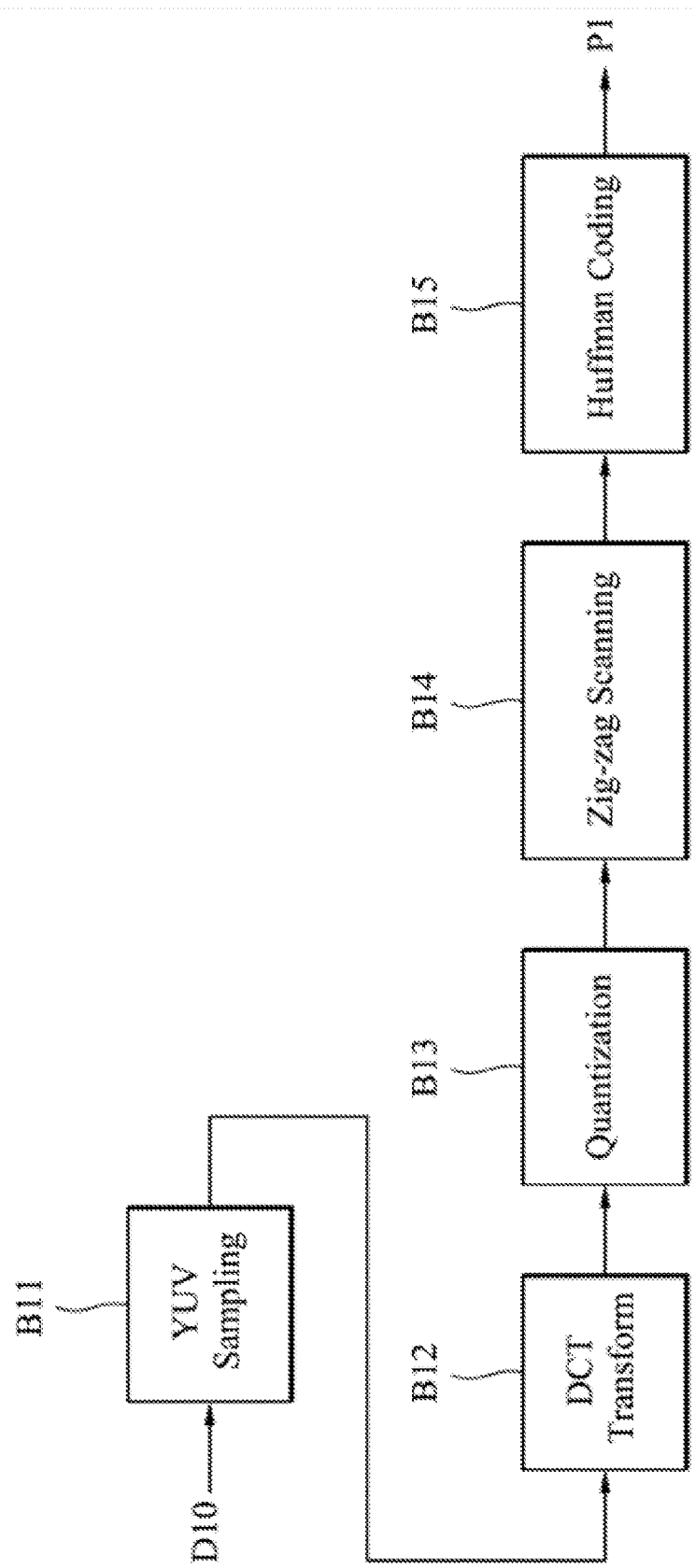
FIG. 1 is a flowchart illustrating a compression process for Joint Photographic Experts Group (JPEG) images according to the prior art.
Figure 2:
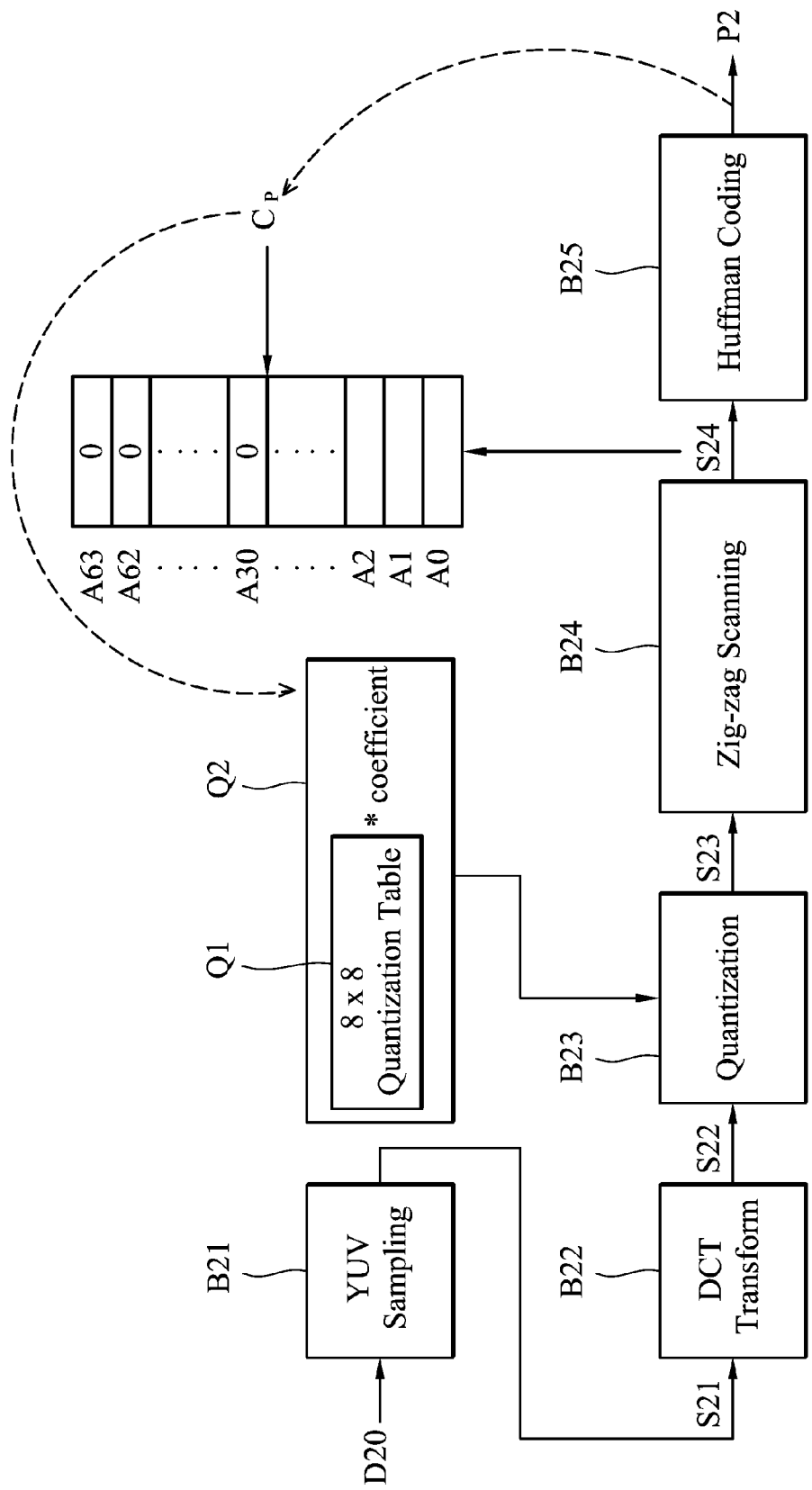
FIG. 2 is a flowchart illustrating processing of a JPEG image according to an embodiment of the invention.

FIG. 2 is a flowchart illustrating processing of a JPEG image according to an embodiment of the invention. A JPEG image data comprises at least two sub-image data D20 being processed to generate a first image processing signal S21 via YUV sampling (step B21). The first image processing signal S21 is used to generate a second image processing signal S22 via discrete cosine transform (DCT) (step B22). The second image processing signal S22 is provided to generate a third image processing S23 according to a quantization table Q1 (step B223). Next, the third image processing signal S23 is operated to generate a fourth image processing signal S24 via zig-zag scanning (step B24). Note that the steps of signal quantization and zig-zag scanning can be interchanged without changing the results. Then, the fourth image processing signal S24 is used to generate an output image signal P2 via Huffman decoding (step B25). A cut point value (Cp) of a next fourth image processing signal S24 is adjusted according to the size of the output image signal P2 so as to determine the size of the next fourth image signal S24. According to another embodiment of the invention, the cut point value (Cp) of the next fourth image processing signal S24 is adjusted according to the size of previous two output image signals P2 so as to determine the size of a next fourth image signal S24. The size is not limited to being determined from previous one or two output image signals P2.

According to one embodiment of the invention, the fourth image processing signal S24 comprises 64 values A0~A63, wherein the value A0 represents a DC value and other values A1~A63 represent AC values. An n (from 1 to 63) represents a signal with different frequencies and a larger n represents a higher signal frequency, which affects the image quality less. As shown in FIG. 2, when the cut point Cp is set as 30, the values A30~A63 are set to be zero to control the size of the fourth image processing signal S24. A JPEG image data comprises at least two sub-image data D20, and each sub-image data D20 is used to dynamically adjust the cut point Cp according to the size of the output image signal P2. Thus, different sub-image data D20 comprises a respective cut point Cp.

Figure 3:
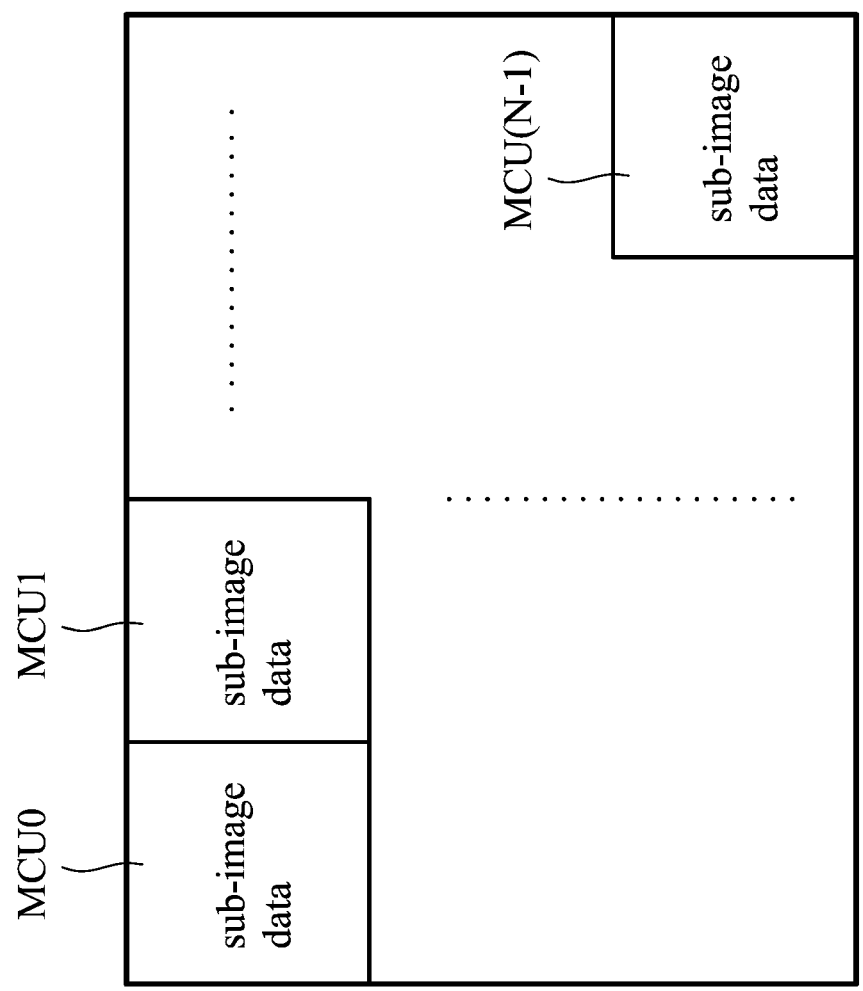
FIG. 3 shows a block diagram of data structure according to another embodiment of the invention.

FIG. 3 shows a block diagram of data structure according to another embodiment of the invention. A second image processing signal S22 comprises N sub-image data MCU0~MCU(N−1), wherein each sub-image data MCU comprises an 8×8 data matrix. Referring to FIG. 2, a quantization table Q1 is an 8×8 data matrix. The sub-image data MCU and the quantization table Q1 are not limited to being an 8×8 data matrix according to the invention. The sub-image data MCU and the quantization table Q1 may also be different N×N data matrices, respectively. When the sub-image data MCU0 is provided to be the output image signal P2, the size thereof is used to adjust the cut point Cp. Meanwhile, the sub-image data MCU1 is output by zig-zag scanning B24 to be the fourth image processing signal S24. Note that the cut point Cp is used to control the sub-image data MCU1 or adjust the size of the fourth image processing signal S24. Similarly, when the sub-image data MCU1 is provided to be the output image signal P2, the size thereof is used to adjust the cut point Cp and control the size of the sub-image data MCU2 being processed by zig-zag scanning B24. In still another embodiment, the cut point Cp for controlling the sub-image data MCU2 is also determined by a mean value of the size of the output image signal P2 from the sub-image data MCU0 and MCU1.

According to another embodiment of the invention, each JPEG image data comprises a plurality of sub-image data D20. When a digital signal processor (DSP) performs processing of one or more JPEG image data, the digital signal processor dynamically adjusts a corresponding quantization table Q1 of a next image data by averaging all cut point values of the previous one or more image data. The adjustment is accomplished by adjusting a coefficient for multiplying a predetermined quantization table Q2 to generate a new quantization table Q1. Thus, the digital signal processor may provide an image output data with a specific size by adjusting the quantization table Q1, the cut point Cp, or both accordingly, a desired balance between image size and image quality is achieved.

Figure 4:
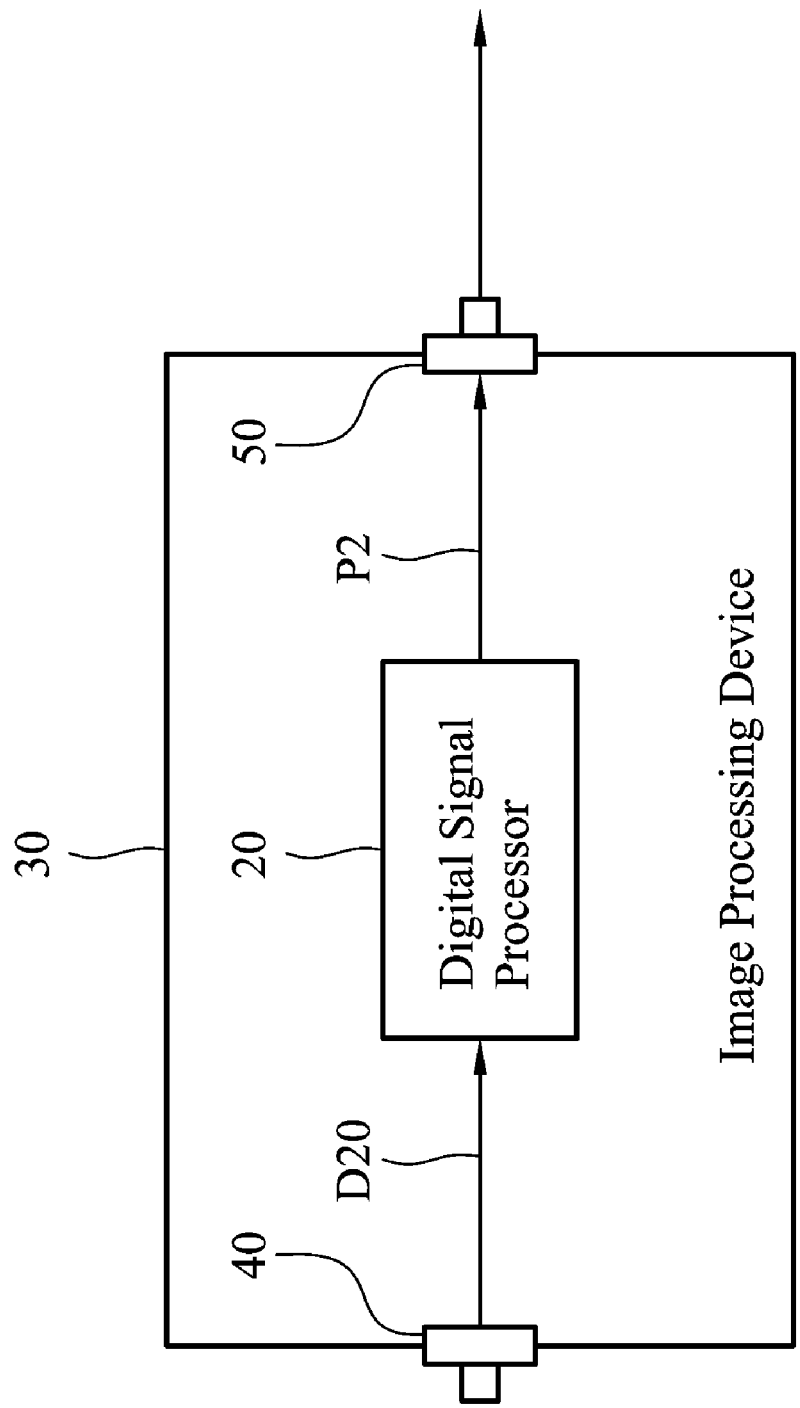
FIG. 4 is a block diagram illustrating an image processing device according to still another embodiment of the invention.

FIG. 4 is a block diagram illustrating an image processing device 30 according to still another embodiment of the invention. The image processing device 30 comprises a camera 40, a digital signal processor (DSP) 20 and an output device 50. The camera 40 may photograph one image at a time or continuously take a plurality of images, and transmit the image data D20 to the digital signal processor 20. The digital signal processor 20 receives the image data D20 and generates an output image data with a fixed size P2 to the output device 50 according to the aforementioned embodiments of the image processing method. When the size of the output image data P2 exceeds a predetermined value, the digital signal processor 20 may decrease the cut point Cp to reduce the size of the output image data, thereby avoiding the problem wherein the output device is unable to process the output image data due to the significantly large amount of data. When the size of the output image data P2 is smaller than a predetermined value, the digital signal processor 20 may increase the cut point Cp to gain more output image data P2 to maintain image quality. The output device 50 may be a universal serial bus (USB) device or other output devices. The image processing device 30 may be a web camera or other JPEG image processing devices. The image processing device 30 is applicable in a notebook or personal digital products.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. An image processing method for processing at least one image data, comprising:
    sampling sub-image data to generate a first image processing signal;
    discrete cosine transforming the first image processing signal to generate a second image processing signal;
    quantizing the second image processing signal according to a quantization table so as to generate a third image processing signal;
    zig-zag scanning the third image processing signal to generate a fourth image processing signal;
    Huffman coding the fourth image processing signal to generate an output image signal; and
    adjusting a cut point of a next fourth image processing signal according to the size of the fourth image processing signal so as to control the size of a next output image signal, wherein the fourth image processing signal following the cut point is zero-valued to control the size of the fourth image processing signal.

2. The image processing method as claimed in claim 1, wherein the image data comprises at least two sub-image data each having respective cut points.

3. The image processing method as claimed in claim 2, further comprising:
    adjusting the quantization table of the next image data according to each cut point from the image data.

4. The image processing method as claimed in claim 3, wherein the quantization table comprises at least two values and a coefficient is provided for multiplying the quantization table to adjust the quantization table of the next image data.

5. The image processing method as claimed in claim 1, further comprising:
    adjusting the quantization table and the cut point to control the size of the fourth image processing signal.

6. The image processing method as claimed in claim 5, wherein the sub-image data and the quantization table are of a respective N×N data matrix.

7. An image processing device, comprising:
    a camera for providing at least one image data;
    a digital signal processor for processing the image data, wherein the digital signal processor samples sub-image data to generate a first image processing signal, discrete cosine transforms the first image processing signal to generate a second image processing signal, uses a quantization table to quantize the second image processing signal to generate a third image processing signal, Zig-Zag scans the third image processing signal to generate a fourth image processing signal, Huffman codes the fourth image processing signal to generate an output image signal, and adjusts a cut point of a next fourth image processing signal according to the size of the fourth image processing signal so as to control the size of a next output image signal, wherein the fourth image processing signal following the cut point is zero-valued to control the size of the fourth image processing signal; and
    an output device for outputting the output image signal.

8. The image processing device as claimed in claim 7, wherein the image data comprises at least two sub-image data each having respective cut point.

9. The image processing device as claimed in claim 8, wherein the quantization table of the next image data is adjusted according to each cut point from the image data.

10. The image processing device as claimed in claim 9, wherein the quantization table comprises at least two values and a coefficient is provided for multiplying the quantization table to adjust the quantization table of the next image data.

11. The image processing device as claimed in claim 7, the quantization table and the cut point is adjusted to control the size of the fourth image processing signal.

12. The image processing device as claimed in claim 7, wherein the sub-image data and the quantization table are of a respective N×N data matrix.

13. The image processing device as claimed in claim 7, wherein the output device is a universal serial bus (USB) device.

14. The image processing device as claimed in claim 7, wherein the image processing device comprises a web camera and a Joint Photographic Experts Group (JPEG) image processing device.

15. An image processing method for processing at least one image data, comprising:
 quantizing a first image signal of the image data according to a quantization table so as to generate a second image signal;
 zig-zag scanning the second image signal to generate a third image signal;
 Huffman coding the third image signal to generate an output image signal;
 adjusting a cut point of a next third image signal according to the size of the third image signal so as to control the size of a next output image signal, wherein the third image signal following the cut point is zero-valued to control the size of the third image signal; and
 adjusting the quantization table of the next image data according to the cut point from the image data,
 wherein a coefficient is provided for multiplying the quantization table to adjust the quantization table of the next image data.

* * * * *